United States Patent
Sapir

(10) Patent No.: US 8,411,346 B2
(45) Date of Patent: Apr. 2, 2013

(54) GRAVITY OPERATED, ROTATABLE LENS CURTAIN FOR THERMAL IMAGER

(75) Inventor: Itzhak Sapir, Irvine, CA (US)

(73) Assignee: ISC8 Inc., Costa Mesa, CA (US)

( * ) Notice: Subject to any disclaimer, the term of this patent is extended or adjusted under 35 U.S.C. 154(b) by 344 days.

(21) Appl. No.: 12/803,134

(22) Filed: Jun. 18, 2010

(65) Prior Publication Data
US 2011/0032593 A1   Feb. 10, 2011

Related U.S. Application Data

(60) Provisional application No. 61/273,576, filed on Aug. 6, 2009.

(51) Int. Cl.
*G02B 23/00* (2006.01)

(52) U.S. Cl. .......................................... 359/234; 359/399

(58) Field of Classification Search .................. None
See application file for complete search history.

(56) References Cited

U.S. PATENT DOCUMENTS 6,046,836 A * 4/2000 Tuchman ...................... 359/230
7,304,297 B1 * 12/2007 King et al. .................. 250/252.1

* cited by examiner

*Primary Examiner* — Stephone B. Allen
*Assistant Examiner* — Jyotsna Dabbi
(74) *Attorney, Agent, or Firm* — W. Eric Boyd, Esq.

(57) ABSTRACT

A device for in-situ thermal imager calibration having a rotatable lens curtain with an aperture for the lens of a thermal imager to observe a scene. The lens curtain includes a balancing weight and blocking portion having a thermally uniform interior calibration surface that is rotatably disposed such that when the UAS is in level flight, the lens views the scene through the aperture. When the UAS is laterally rotated about its flight path, the lens curtain maintains its absolute position relative to the Earth by virtue of the balance weight and the lens rotates within the lens curtain for viewing a thermally uniform interior surface for calibration.

4 Claims, 2 Drawing Sheets

GRAVITY OPERATED, ROTATABLE LENS CURTAIN FOR THERMAL IMAGER

CROSS-REFERENCE TO RELATED APPLICATIONS

This application claims the benefit of U.S. Provisional Patent Application No. 61/273,576, filed on Aug. 6, 2009, entitled "Gravity Operated, Hinged Lens Curtain" pursuant to 35 USC 119, which application is incorporated fully herein by reference.

STATEMENT REGARDING FEDERALLY SPONSORED RESEARCH AND DEVELOPMENT

N/A

BACKGROUND OF THE ART

1. Field of the Invention

The invention relates generally to the field of calibration of thermal imaging devices. More specifically, the invention relates to a device for the in-situ calibration of an uncooled focal plane array imager, for instance, the calibration of a thermal imaging camera used in a small unmanned aerial vehicle or unmanned aerial system ("UAV" and "UAS" respectively) during flight.

2. Background of the Invention

Thermal imaging cameras (including UAV airborne thermal cameras) typically require single-point, pixel non-uniformity correction calibration against a uniform temperature scene to produce smooth, strip-free, ghost-free images. This calibration step is generally performed with the imager at a predetermined calibration temperature in, for instance, a temperature controlled calibration chamber. Nonetheless, in actual use and as the temperature of the imager changes while in operation (e.g., cools down due to air flow during flight or heats up due to heat dissipated from surrounding electronics), the imager will tend to drift out of calibration with resultant image-quality deterioration. Regular calibration of the imager during operation resolves the temperature-change related image-quality problems but in order to calibrate the imager in-flight, prior art cameras use a mechanical shutter element to provide a thermally uniform surface.

In prior art devices, an imager is calibrated to adjust for thermal drift and non-uniformity by closing a mechanical shutter whereby the imager is recalibrated by viewing a thermally uniform shutter surface and making electronic uniformity adjustments to the individual pixels on the focal plane array. In other words, the imager is calibrated in the field by making adjustments to the output of the individual pixels across the array while viewing a thermally uniform surface so that there is a uniform output when the imager sees a thermally uniform surface.

Unfortunately, prior art mechanical shutter elements have proven to be unreliable, relatively heavy and complex and thus are undesirable. As a result, it is common that UAS thermal imagers are frequently provided without a mechanical shutter element and therefore cannot be calibrated in flight.

A second problem the present invention solves is the risk of damaging an imager if directly viewing the sun. With no shutter (or with the shutter open when taking images or video), the imager by the nature of its design and materials, can be permanently damaged if directed toward the sun even for short periods of time. The current instructions for UAS operators are just "don't fly with the sun in your line of sight."

An unintentional maneuver or operator's error that allows the sun to appear in the camera's line of sight may cause camera damage. The present invention protects the camera from this type of damage.

The disclosed invention provides a shutterless calibration solution for in-flight thermal imaging non-uniformity correction that is robust, reliable, and lightweight and does not have the reliability issues associated with an electro-mechanical shutter and also minimizes the risk of imager damage due to direct viewing of the sun.

The present invention is gravity-operated and configured in a UAS such that the imager lens is obscured from view whenever it points above the horizon. In-flight calibration can be initiated by a calibration command to the camera whenever the lens points above the horizon.

This can be done continuously at predetermined calibration intervals or as a "calibration command" given to the UAS that puts it in a right-turn flight mode (for a camera system looking left). The device may be configured wherein a right turn automatically initiates calibration depending on the user's design preference.

SUMMARY OF THE INVENTION

A device for in-situ calibration of a thermal imager on a UAS is disclosed. A rotatable lens curtain is provided with an aperture for the lens of a thermal imager to observe a field of view. The lens curtain comprises a balancing weight and blocking portion having a thermally uniform interior surface that functions as a calibration surface. The lens curtain is disposed with respect to the lens such that when the UAS is in a turn flight path, the lens is exposed to the field of view through the aperture. The lens curtain is provided such that when the UAS rolls (rotates around the axis pointing in the direction of flight), the lens curtain maintains its absolute position relative to the Earth by virtue of the balance weight and the lens rotates within the lens curtain such that the blocking position obscures the lens from the field of view and the lens is exposed to the thermally uniform interior surface such that a calibration operation can be performed by the thermal imager.

In a first embodiment, a device is provided for selectively blocking and unblocking the field of view of a lens comprising a lens curtain with an aperture and a blocking portion where the curtain is disposed so as to rotate about an axis whereby the lens is aligned in a first position with respect to the aperture when in a first orientation about the axis and whereby the lens is aligned in a second position with respect to the blocking portion when in a second orientation about the axis.

In yet a second embodiment, the device further comprises a thermal imager.

In yet a third embodiment, the lens curtain comprises a thermally uniform interior surface.

In yet a fourth embodiment, the thermally uniform interior surface comprises a calibration surface for the thermal imager.

These and other embodiments are set forth below and described in the accompanying description of the invention.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE INVENTION

Figure 1:
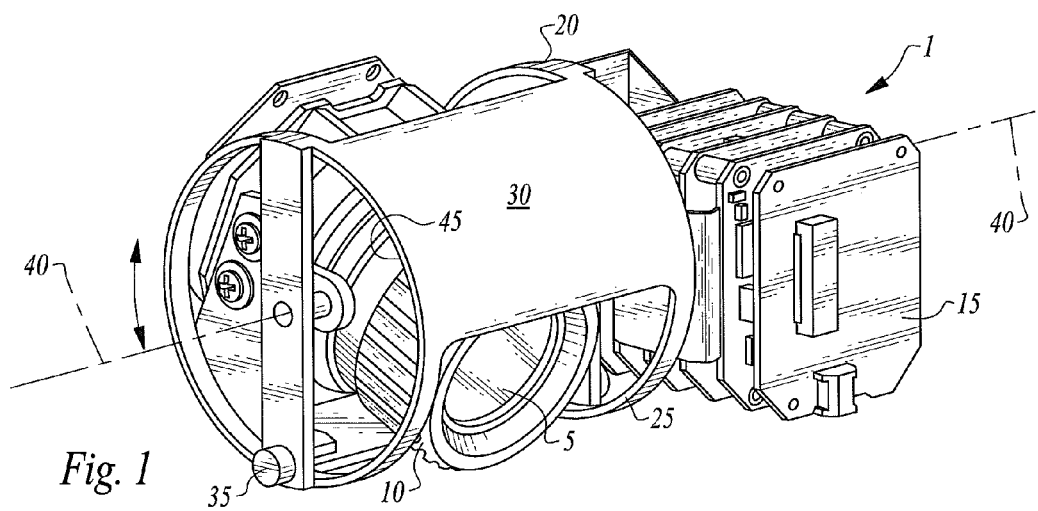
FIG. 1 is a perspective view of the lens curtain of the invention showing a lens disposed therein.

Turning now to the figures wherein like numerals define like elements among the several views, FIG. 1 illustrates a thermal imager assembly 1 such as may be an element of a UAS. Thermal imager assembly 1 comprises a lens 5, lens housing 10 and support electronics 15.

Further illustrated is a preferred embodiment of the gravity-operated, rotatable calibration lens curtain 20 of the invention.

In the illustrated embodiment, lens curtain 20 comprises a viewing aperture 25, a blocking portion 30 and a balance weight 35. Lens curtain is rotatably disposed to rotate about axis 40. The interior surface of blocking portion 30 comprises a thermally uniform interior surface 45 such as is suitable for the thermal calibration of a thermal imager.

Balance weight 35 provides means to maintain an absolute rotational position of lens curtain 20, with respect to axis 40. In other words, balance weight 35 provides means to rotatably bias and orient the elements of curtain 20 about axis 40 with respect to the Earth using gravity and irrespective of the overall axis orientation of thermal imager assembly 1. This is accomplished because the mass of balance weight 35 causes curtain 20 to maintain its absolute position with respect to the gravitational pull of the Earth.

In an alternative preferred embodiment (not shown), curtain 20 may be provided with a damping mechanism such as a magnetic or mechanical damping means to inhibit oscillating or "swinging" of curtain 20 about its axis when the UAS changes roll orientation.

Balance weight 35 therefore effectively repositions curtain 20 with respect to axis 40, and thus with respect to lens 5, when thermal imager assembly 1 is rotated with respect to axis 40.

Figure 2:
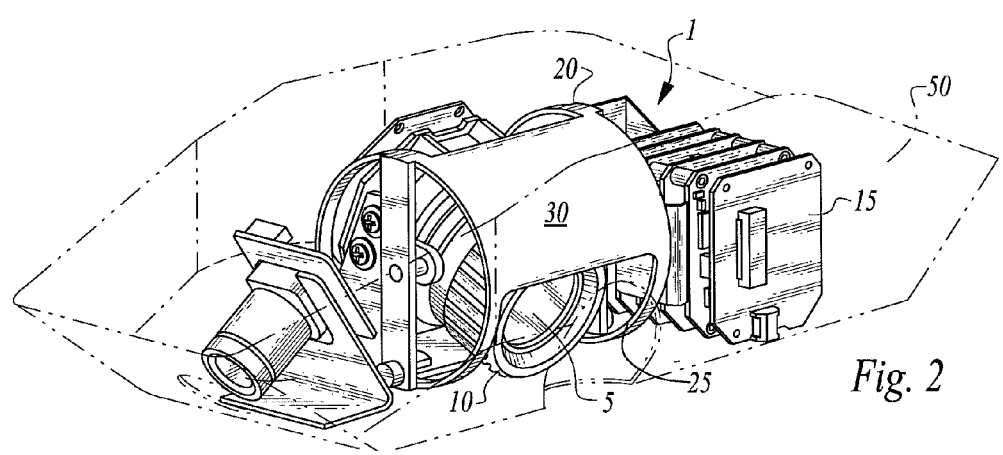
FIG. 2 is a perspective view of the lens curtain of FIG. 1 showing an exemplar view of the disposition of the assembly in a housing.

FIG. 2 illustrates the assembly of FIG. 1 as it may be installed a UAV housing 50 and shows an exemplar disposition therein.

Figure 3:
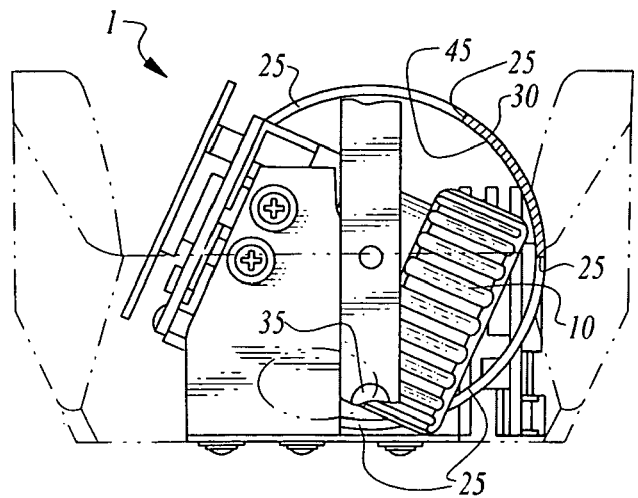
FIG. 3 illustrates a side view of the invention wherein the imager is viewing a scene through a portion of the aperture.
Figure 4:
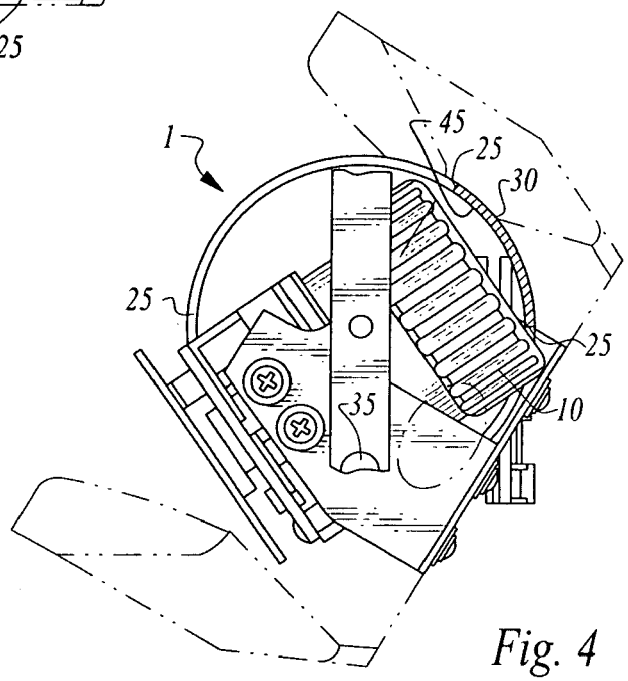
FIG. 4 is a side view of the invention wherein the imager's field of view is closed by the blocking portion of the lens curtain while viewing a thermally uniform interior surface of the lens curtain in a right turn of the UAS.

The operation of curtain 2 of the invention is better seen in FIGS. 3 and 4.

The imager "viewing" mode of operation shown in FIG. 3 illustrates the orientation of aperture 25 aligned with lens 5 so that the field of view of the imager is at least partially unobscured and partially "open" when UAS housing and the imager assembly 1 is in a substantially level flight path. In this orientation, aperture 25 is thus partially aligned with lens 5 as the result of balance weight 35 biasing lens curtain 20 about axis 40 such that the field of view is open through aperture 25.

In a calibration or "non-viewing" mode as is shown in FIG. 4, when an operator desires to calibrate thermal imager assembly 1 in, for instance, an in-flight UAS, a "roll" command is sent to the UAS. In this mode, thermal imager assembly 1 is rotated a predetermined amount about axis 40. This orients thermal imager assembly 1 as shown in FIG. 4, which, in the illustrated embodiment, shows the UAS in a right turn.

As the UAS turns right in the illustrated embodiment, balance weight 35 of rotatable curtain seeks to maintain its absolute position with respect to the Earth and as a result, lens 5 effectively rotates within curtain 20 and is obscured (i.e., closed) by blocking portion 30. In this orientation, the field of view of lens 5 is blocked and its field of view is limited solely to thermally uniform interior portion 45. While the UAS maintains its roll orientation, a thermal imager calibration command can be sent to the UAS and the imager is calibrated viewing the thermally uniform interior portion 45. Once calibration is complete, a command is sent to the UAS to return to its desired orientation and the UAS continues its operation.

A further benefit and application of curtain 20 is protection of the imager from exposure of direct sun viewing. The invention may be configured to provide automatic, continuous blocking of the camera's field of view in the event the camera looks above the horizon where direct viewing of the imager into the sun may occur. In this manner, the sun's direct radiation does not enter the field of view of the imager, creating an embedded imager protection.

Figure 5:
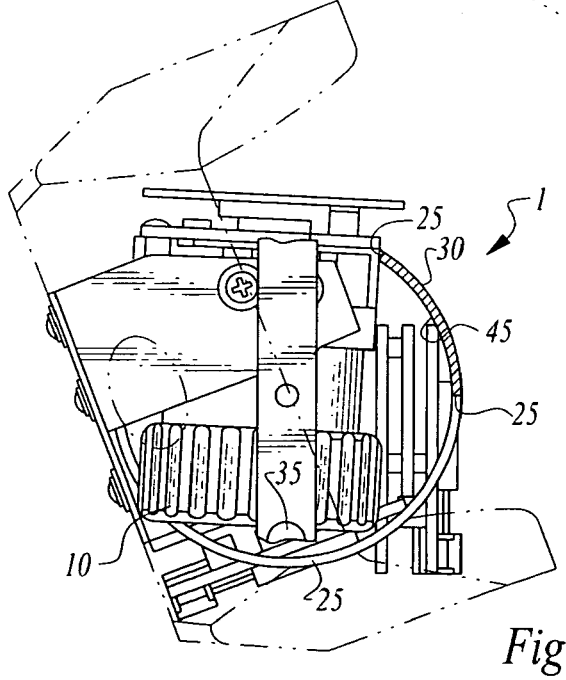
FIG. 5 is a side view of the invention wherein the imager's field of view is fully open through the aperture and unobscured by the lens curtain during a left turn of the UAS.

Turning to FIG. 5, when the UAS is put into a left turn as shown, lens 5 is aligned fully to view through aperture 25 whereby the entire field of view is open and unobscured by lens curtain 20.

It is noted the operation of the curtain of the invention as described above may be also be configured as a forward-looking imager other than the side-looking configuration as shown in the accompanying figures. In the case of a forward-looking imager, the pivot point for the rotatable curtain is mounted perpendicularly to the direction of flight and the calibration mode is achieved when the airframe is in a climbing flight path or in a pre-determined angle of attack.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Although elements may be described above as acting in certain combinations and even initially claimed as such, it is to be expressly understood that one or more elements from a claimed combination can, in some cases, be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

I claim:

1. A device for selectively performing an imager calibration operation comprising:
   a lens curtain comprising an aperture, a balance weight and a blocking portion,
   the lens curtain disposed so as to rotate about an axis,
   the balance weight configured to maintain an absolute position of the lens curtain with respect to a gravitational pull of the Earth,
   whereby a field of view of a lens is aligned with the aperture in a first orientation about the axis, and,
   whereby the field of view of the lens is aligned with the blocking portion in a second orientation about the axis.

2. The device of claim 1 further comprising a thermal imager.

3. The device of claim 1 wherein the blocking portion comprises a thermally uniform interior surface.

4. The device of claim 3 wherein the thermally uniform interior surface comprises a calibration surface for the thermal imager.

* * * * *